Patented June 11, 1946

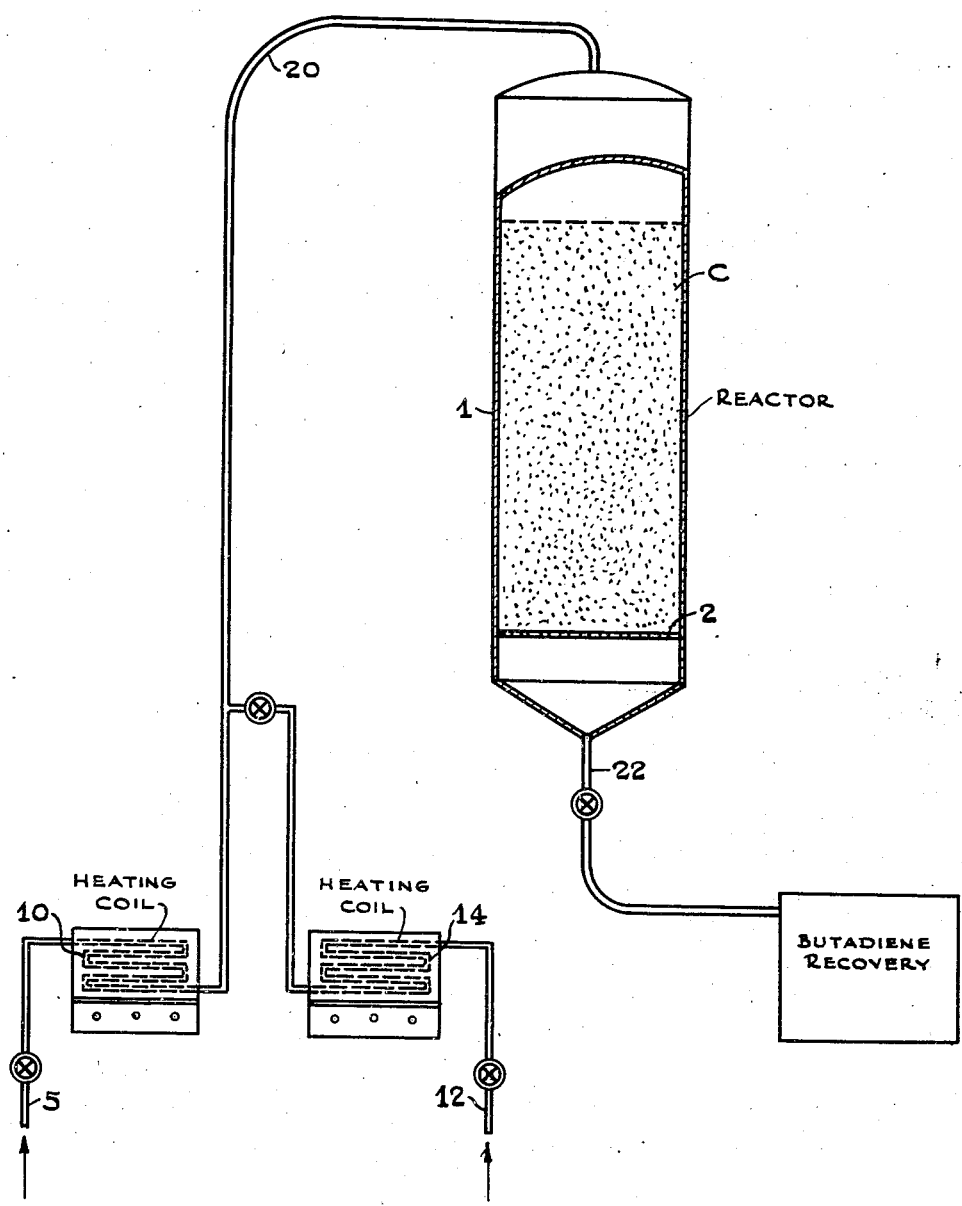

2,401,846

UNITED STATES PATENT OFFICE 2,401,846

PROCEDURE FOR OLEFIN DEHYDROGENATION

Simpson D. Sumerford, Baton Rouge, La., assignor to Standard Oil Development Company, a corporation of Delaware Application December 22, 1943, Serial No. 515,218

10 Claims. (Cl. 260—680)

This invention relates to the novel features hereinafter described in the specification and claims, more particularly it relates to a method for improving dehydrogenation catalysts.

It is a matter of record to dehydrogenate butane or butenes to form butadiene. At the present time it appears that butane is best dehydrogenated in two stages to form butadiene; first, a dehydrogenation operation using a dehydrogenation catalyst to form butene, followed by a second dehydrogenation using catalyst consisting of iron oxide supported on a suitable base and promoted with a compound of an alkali metal, particularly potassium oxide. It has been known for some time that the dehydrogenation of butenes such as butene-2 to form butadiene was an operation whose selectivity was difficult to maintain at a high level due to the tendency of the nascent butadiene to polymerize. At first this difficulty was counteracted by operating at very low pressures, that is, pressures of 100 mm. of mercury or lower.

In a large scale commercial plant it is difficult and expensive to operate in this manner. It has been suggested previously that the difficulty of maintaining a low pressure on the butadiene freshly formed could be overcome by diluting with steam in amounts up to twenty volumes of steam per volume of reactant, whereupon when the total gas pressure in the zone was one atmosphere the partial pressure of the nascent butadiene would be below 100 mm. and the tendency to polymerize would be effectively counteracted. But unfortunately most of the dehydrogenation catalysts are affected adversely by steam. The researches of Kenneth K. Kearby led to the discovery of a class of catalysts which is insensitive to steam and at the same time is active in the dehydrogenation of butene to butadiene. A full description of these catalysts and the method of using them is given in the application of said Kearby, Serial No. 430,873, filed February 14, 1942.

My present invention has to do with improvements in dehydrogenating butenes, employing a catalyst of the type described and claimed in the aforesaid Kearby application, under conditions such as to improve the operation of the catalyst, all of which will subsequently fully appear hereinafter.

The main object of my present invention has to do with improvements in the catalytic dehydrogenation of n-butenes, particularly in the presence of steam, to form butadiene. More particularly, my invention has to do with the catalytic dehydrogenation of n-butenes and has for its object the accomplishment of increased yields and higher selectivity. Other and further objects of my present invention will appear in the following more detailed description.

In brief compass, my present invention relates to pretreating the dehydrogenation catalyst with natural gas and steam during the period when the catalyst is being brought up to reaction period from a cold start, and my researches have indicated that this pretreatment causes a higher initial activity than with steam catalyst pretreatment alone. In other words, prior to my invention in order to activate a catalyst of the type indicated it has been customary to treat the catalyst first with steam. To cite a specific example, a catalyst composed of the following components in parts by weight was employed:

| | Per cent |
|---|---|
| $Fe_2O_3$ | 19 |
| MgO | 72 |
| CuO | 4.5 |
| $K_2O$ | 4.5 |
| | 100 |

The catalyst was pretreated with steam and natural gas in accordance with the data set forth in the description below and also with steam alone in accordance with the data set forth in the discussion below, with the results therein indicated.

First, in order to understand my invention more readily, I have provided in the accompanying drawing a flow plan which illustrates diagrammatically an embodiment of my invention.

In the drawing, I represents a reaction zone containing the catalyst above identified in the form of pills, the catalyst being identified by C. This catalyst is supported on a grid 2; n-butene is introduced into the system through line 5 and passed through a heating coil 10, where its temperature is raised to say 900–1100° F. Simultaneously, steam enters the present system through line 12 and is superheated in 14 to a temperature of 1200° F. The steam and n-butene are then mixed in a feed line 20 and discharged into the top of the reactor, thereafter they flow through the reactor contacting the catalyst and are withdrawn through line 22. The product comprising a mixture of butadiene, n-butene and steam in line 22 is cooled and solvent treated in known manner which need not be discussed herein for its details are known to those familiar with the art. I have simply illustrated in the drawing sufficient of the conventional process to afford a better understanding of my invention, and it will be recognized that numerous expedients may be resorted to to improve the operation such as those, for instance, disclosed in the application of Carl Kleiber et al., Serial No. 486,636, filed May 12, 1943.

In operating a unit of the type indicated in the drawing, from 8–12 volumes of steam are fed with the butene feed normally for one hour, whereupon the butene feed is discontinued by closing the valve in line 5 and steam only is fed to the reactor, the purpose of the steam being to regenerate the catalyst, for the productive phase of the operation results in the formation of deposits on the catalyst. Thus, the process continues usually on alternate productive and regeneration phases of about one hour duration each. Of course these phases may be extended for more than an hour or may be less than an hour, but usually as indicated they are of about one hour's duration. It is also pointed out that during the regeneration phase a small amount of oxygen may be mixed with the steam to aid in the regeneration.

I have found by laboratory test made under the same conditions except on the pretreat that instead of merely treating the catalyst with steam during the initial heating-up period better results are obtained by mixing with the steam, methane or natural gas in quantities in the range of 5 to 50% of the total mixture.

To show the improvement obtained by employing my pretreat method I set forth below the results of 26 cycles in which during the heating-up period before productive phases were started the catalyst was treated with steam.

| Pretreat | Cycle | Conv. | Yield | Selectivity |
| --- | --- | --- | --- | --- |
| Steam only | 3 | 15.4 | 12.5 | 81 |
|  | 15 | 30.5 | 23.0 | 76 |
|  | 26 | 28.8 | 24.0 | 83 |

In 26 cycles after using steam and methane in the ratio of 12:1 during the heating-up period, I secured the results below:

| Pretreat | Cycle | Conv. | Yield | Selectivity |
| --- | --- | --- | --- | --- |
| Steam+8% CH₄ | 3 | 27.0 | 21.8 | 81 |
|  | 15 | 34.3 | 26.2 | 76 |
|  | 26 | 29.5 | 24.7 | 84 |

Comparing the results from the runs made identically except for the difference in the pretreat, it will be noted at the beginning of the operation, namely, during cycle 3, the operation was better from the standpoint of conversion and yield where steam was mixed with methane during the pretreating or activation phase. The comparison of the tables shows that the catalyst had a better initial activity and was not characterized by an induction period of low activity which at times has been known to last for several days. The tables also show by reference to cycles 15 and 26 that the operation was better after the induction period from the standpoint of conversion and yield where steam and methane were used to activate the catalyst.

With regard to pilot plant operation, results obtained without pretreatment of catalyst with natural gas compared with data obtained after activation of the catalyst with natural gas and steam show an improvement similar to that pointed out in the above tables. Thus in one run, in which no activation was used, an average selectivity of about 67% was obtained at 30% conversion. In another run, in which the catalyst was heated to reaction temperature with steam containing 10% natural gas, the average selectivity at 30% conversion was about 76%, which represents a material increase in butadiene production.

To recapitulate briefly, my invention relates to improving the activity of dehydrogenation catalysts, particularly one which is not affected by steam and which contains an active oxide. I believe, although I do not wish to be bound by any theory, that in the normal activation (using steam only) of such catalysts there is some danger of overoxidizing the active catalyst. This is evidenced by the lower initial activity of the catalyst particularly, although it also is observed in the more aged catalyst. In any event, I have found that by activating the catalyst with a mixture of steam and natural gas, or steam and methane, or steam and any normally gaseous paraffin I improve the operation of the catalyst. It is to be understood that my process is applicable to the use of other catalysts such as iron oxide supported on alumina, or any active oxide supported on a carrier base, particularly one which is capable of existing in more than one valence.

Numerous modifications of my invention will appear to those who are familiar with this art. For example, the process described hereinbefore for the dehydrogenation of butene is applicable to styrene production by dehydrogenation of ethyl benzene, i. e., employing the same catalyst, temperature and pressure conditions, etc. In fact, the process is applicable to the dehydrogenation of any saturated alkyl radical containing at least two carbon atoms attached to an aromatic nucleus, as well as to the dehydrogenation of mono-olefinic hydrocarbons generally.

What I claim is:

1. In the preparation of diolefins by catalytic dehydrogenation of olefins with a steam resistant catalyst in the presence of steam, the step which comprises activating the catalyst prior to the dehydrogenation stage by passing a mixture of steam and a normally gaseous paraffin hydrocarbon in contact with the catalyst.

2. Method according to claim 1, in which the hydrocarbon constitutes from 5 to 50% of the steam-hydrocarbon mixture.

3. The method set forth in claim 1, in which the olefin to be dehydrognated is n-butene.

4. The method of claim 1, in which the catalyst consists of iron oxide supported on magnesium oxide and contains a promoter.

5. A method for dehydrogenating n-butene to form butadiene, which comprises providing a bed of steam resistant catalyst material containing iron oxide and supported on a carrier, activating the catalyst by pretreating with steam and natural gas, charging a mixture of steam and n-butene to the reaction zone maintained at a temperature within the range of 1100–1300° F., periodically discontinuing the feed of butene to the bed of catalyst, and feeding steam to the bed of catalyst to regenerate the same.

6. In the catalytic dehydrogenation of hydrocarbons of the class consisting of mono-olefins and alkylated aromatics containing at least two carbon atoms in the side chain with a steam resistant catalyst, the step which comprises activating the catalyst prior to the dehydrogenation stage by passing a mixture of steam and a normally gaseous paraffin hydrocarbon in contact with the catalyst.

7. The process specified in claim 6 in which ethyl benzene is dehydrogenated to form styrene.

8. The process of claim 6 in which the catalyst contains a preponderance of iron oxide, a promoter and a stabilizer.

9. The method of claim 6 in which methane is mixed with the steam during activation of the catalyst.

10. The method of claim 6 in which natural gas is mixed with the steam during activation of the catalyst.

SIMPSON D. SUMERFORD.